(12) United States Patent
Yang et al.

(10) Patent No.: US 9,787,034 B2
(45) Date of Patent: Oct. 10, 2017

(54) CAGE ASSEMBLY

(71) Applicant: Molex, LLC, Lisle, IL (US)

(72) Inventors: Hui-Hsuan Yang, Taipei (TW); Yen-Lin Chen, Taipei (TW)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/099,305

(22) Filed: Apr. 14, 2016

(65) Prior Publication Data

US 2016/0308313 A1   Oct. 20, 2016

(30) Foreign Application Priority Data

Apr. 15, 2015 (TW) .............................. 104205650 U

(51) Int. Cl.
*H01R 13/6587* (2011.01)
*G02B 6/38* (2006.01)
*H01R 13/659* (2011.01)

(52) U.S. Cl.
CPC ....... *H01R 13/6587* (2013.01); *G02B 6/3817* (2013.01); *H01R 13/659* (2013.01)

(58) Field of Classification Search
CPC .................... H01R 13/7172; H01R 13/7175
See application file for complete search history.

(56) References Cited

U.S. PATENT DOCUMENTS

| | | | | |
|---|---|---|---|---|
| 6,283,786 B1 * | 9/2001 | Margulis | ............. | H01R 13/465 439/488 |
| 7,390,212 B1 * | 6/2008 | Yang | .................... | H01R 13/717 439/490 |
| 7,421,184 B2 * | 9/2008 | Long | .................... | G02B 6/0001 362/551 |
| 7,529,094 B2 * | 5/2009 | Miller | .................. | G02B 6/4246 165/185 |
| 7,575,471 B2 * | 8/2009 | Long | .................... | G02B 6/0001 439/541.5 |
| 7,601,021 B1 * | 10/2009 | Yang | .................... | G02B 6/0008 439/487 |
| 7,621,773 B2 * | 11/2009 | Bright | .................. | G02B 6/0008 439/490 |

(Continued)

FOREIGN PATENT DOCUMENTS

CN       202167680 U      3/2012

*Primary Examiner* — Ross Gushi
(74) *Attorney, Agent, or Firm* — Jeffrey K. Jacobs

(57) ABSTRACT

A cage assembly comprises a cage, at least one heat sink, at least one clip and at least one light guide. The cage comprises a front end, a rear end, a top wall positioned between the front end and the rear end and a rear wall positioned at the rear end, the cage is formed with at least one port, the port extends from the front end to the rear end. The heat sink is provided on the top wall of the cage and corresponds to one port. The clip comprises a frame engaged with the top wall and fixing the heat sink and a holding piece extending upwardly from the frame. The light guide has a front section and a rear section, the front section is formed with a first post extending rearwardly, the rear section is formed with two second posts respectively extending forwardly, the first post is inserted into a first hole formed to the holding piece of the clip along a front-to-rear direction, the two second posts are respectively inserted into two second holes formed to the rear wall of the cage along a rear-to-front direction.

9 Claims, 9 Drawing Sheets

(56) References Cited

U.S. PATENT DOCUMENTS

| | | | | |
|---|---|---|---|---|
| 7,712,941 B2* | 5/2010 | Tai | ............... | G02B 6/0008 |
| | | | | 362/581 |
| 7,871,294 B2* | 1/2011 | Long | ............... | G02B 6/0001 |
| | | | | 439/540.1 |
| 8,189,982 B2* | 5/2012 | Yang | ............... | G02B 6/4201 |
| | | | | 385/134 |
| 8,197,282 B1* | 6/2012 | Su | ............... | H01R 13/518 |
| | | | | 439/540.1 |
| 8,335,416 B2* | 12/2012 | Shirk | ............... | G02B 6/0008 |
| | | | | 385/146 |
| 8,465,320 B2* | 6/2013 | Long | ............... | G02B 6/0001 |
| | | | | 439/541.5 |
| 8,469,738 B2* | 6/2013 | Long | ............... | G02B 6/0001 |
| | | | | 439/541.5 |
| 8,684,765 B2* | 4/2014 | Shirk | ............... | G02B 6/0008 |
| | | | | 362/551 |
| 8,823,540 B2* | 9/2014 | Scholeno | ............... | H01R 12/716 |
| | | | | 340/815.4 |
| 9,255,703 B2* | 2/2016 | Auyeung | ............... | F21V 29/502 |
| 2003/0161108 A1* | 8/2003 | Bright | ............... | G02B 6/4201 |
| | | | | 361/707 |
| 2005/0254772 A1* | 11/2005 | Long | ............... | G02B 6/0008 |
| | | | | 385/146 |
| 2005/0255726 A1* | 11/2005 | Long | ............... | G02B 6/0001 |
| | | | | 439/80 |
| 2006/0003632 A1* | 1/2006 | Long | ............... | H01R 12/716 |
| | | | | 439/607.2 |
| 2007/0253168 A1* | 11/2007 | Miller | ............... | G02B 6/4246 |
| | | | | 361/719 |
| 2010/0111476 A1* | 5/2010 | Shirk | ............... | G02B 6/0008 |
| | | | | 385/53 |
| 2015/0285986 A1* | 10/2015 | Wu | ............... | G02B 6/0075 |
| | | | | 362/613 |

* cited by examiner

CAGE ASSEMBLY

RELATED APPLICATIONS

This application claims priority to Taiwanese Application No. 104205650, filed Apr. 15, 2015, which is incorporated herein by reference in its entirety.

TECHNICAL FIELD

The present disclosure relates to a cage assembly, and more specifically relates to a cage assembly having a light guide.

BACKGROUND ART

Chinese patent application No. CN200920006325.5 (corresponding to U.S. Pat. No. 7,601,021 and corresponding to Taiwanese Patent TWM359141) discloses a connector assembly, which mainly comprises an upper cage, a heat dissipating piece, a heat dissipating piece latch member and a light guiding column. The heat dissipating piece latch member allows the heat dissipating piece to be engaged with the upper cage. The light guiding column is provided to the heat dissipating piece latch member, and is used to guide a light beam emitted from a LED positioned on a circuit board, the LED may be used to display whether a connector chip module is failed or not. Heat generated by the connector chip module is effectively dissipated out via the heat dissipating piece and the heat dissipating piece latch member which are detachable, so as to reduce possibility of damaging the connector chip module. Furthermore, two sides of the heat dissipating piece latch member each have a recessed groove, two positions of the light guiding column each have a cylinder corresponding to the recessed groove so as to be correspondingly inserted into the recessed groove.

However, the above known recessed groove is a fork shape opened upwardly, therefore the cylinder of light guiding column is easily detached from the recessed groove, and when the cylinder is inserted into the recessed groove, two sides of the fork opening of the recessed groove should be pushed outwardly and expanded, thereby easily causing the recessed groove to be deformed.

Also, Chinese patent application No. CN201120303406.9 (corresponding to Taiwanese patent TWM418473) discloses a pluggable cage of a connector, which mainly comprises a cage and a light guiding column, the cage is cooperatively formed by an upper plate, a lower plate and two opposite side plates connecting the upper plate and the lower plate, and the cage is a structure integrally formed. The light guiding column is provided above the upper plate. Herein, the light guiding column has a primary rod and two auxiliary rods respectively extending from the primary rod. The two auxiliary rods each have a recessed hole, and the two side plates of the cage each have a protruding tab protruding outwardly, each protruding tab may be engaged with the corresponding recessed hole, so as to allow the light guiding column to be engaged with the two side plates of the cage via the two auxiliary rods. Furthermore, the upper plate has a protruding piece, a distal end of the protruding piece is formed with a plurality of arc opening portions, the primary column of the light guiding column is disposed to the arc opening portions, and the primary column may be further provided with a stopping member engaged with the protruding piece. With the above configuration, the light guiding column may be firmly engaged with the cage.

However, in the above prior art, the engagement between the two recessed holes and the two protruding tabs may not be sufficient firm as the two protruding tabs are easily detached from the two recessed holes. In addition, because the protruding piece is formed from punching the upper plate, when a heat sink is provided to the upper plate, an installing position of the light guiding column must be raised upwardly, but the upper plate does not have enough volume for forming a higher protruding piece, therefore the installing position of the light guiding column is limited.

SUMMARY OF THE INVENTION

In some embodiments, a cage assembly includes a cage, a heat sink, a clip and a light guide. The cage can include a front end, a rear end, a top wall positioned between the front end and the rear end and a rear wall positioned at the rear end, and the cage being formed with a port. The heat sink can be provided on the top wall of the cage and corresponds to the port. The clip engages the cage and comprises a frame fixing the heat sink and a holding piece extending upwardly from the frame. The light guide has a front section positioned above the top wall of the cage of and a rear section positioned behind the rear wall of the cage, the front section is formed with a first post extending rearwardly, the rear section is formed with at least two second posts respectively extending forwardly, the holding piece of the clip is formed with a first hole, the first post of the light guide is inserted into the first hole of the holding piece of the clip along a front-to-rear direction, the rear wall of the cage is formed with second holes respectively corresponding to the second posts, the second post of the light guide is inserted into the second hole of the rear wall of the cage along a rear-to-front direction.

BRIEF DESCRIPTION OF THE DRAWINGS

The other features and effects of the present disclosure will be apparent through the embodiments in combination with the Figures, and in which.

DETAILED DESCRIPTION OF THE PREFERRED EMBODIMENTS

Figure 1:
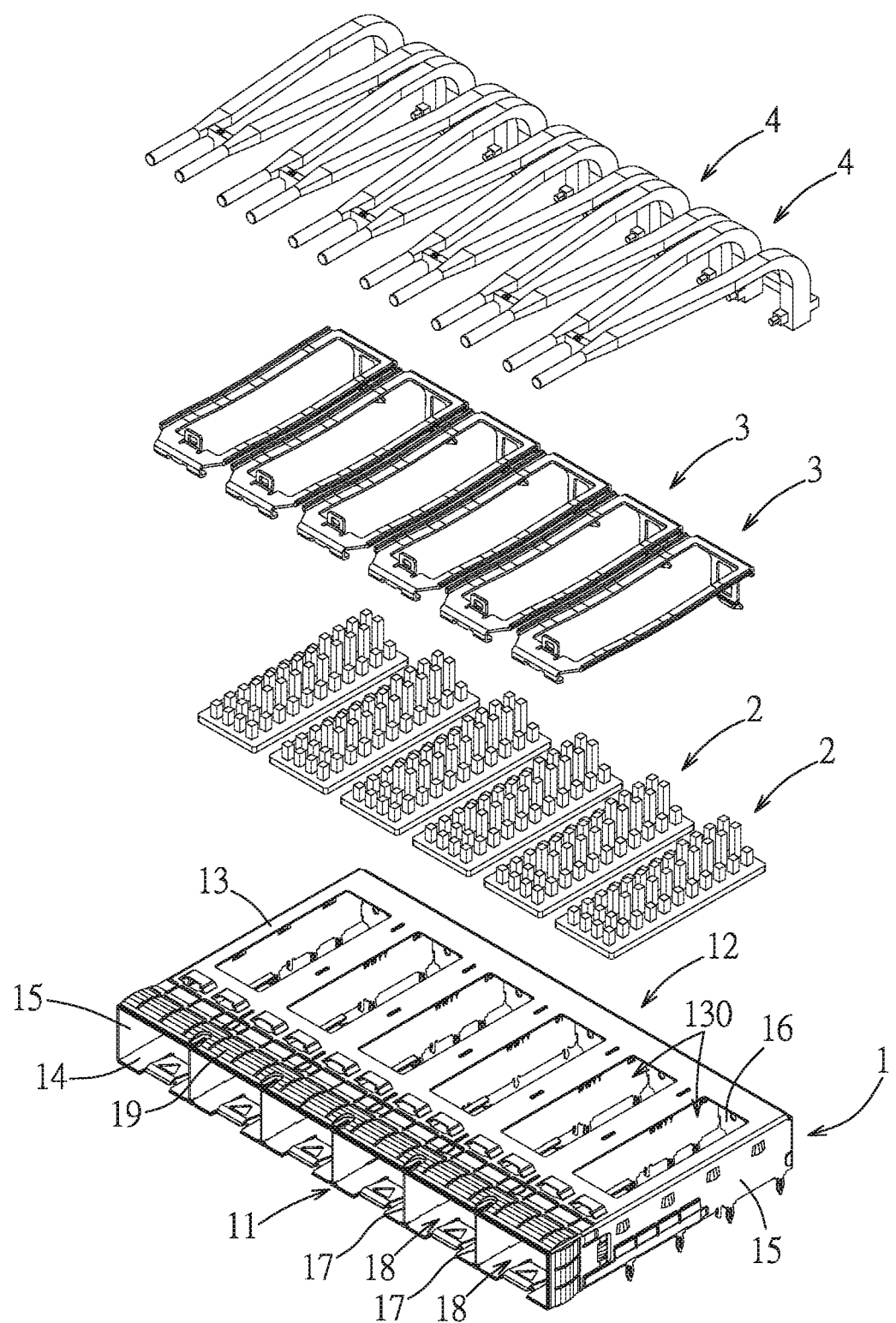
FIG. 1 is an exploded perspective view illustrating an embodiment of a cage assembly of the present disclosure.
Figure 2:
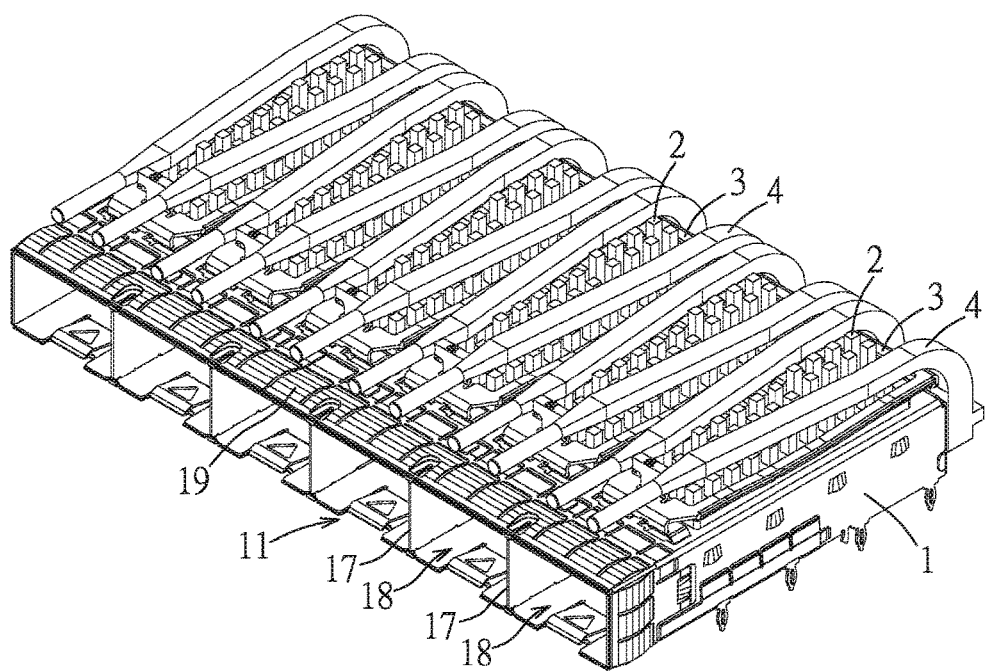
FIG. 2 is a perspective view illustrating an assembled status of the embodiment.
Figure 3:
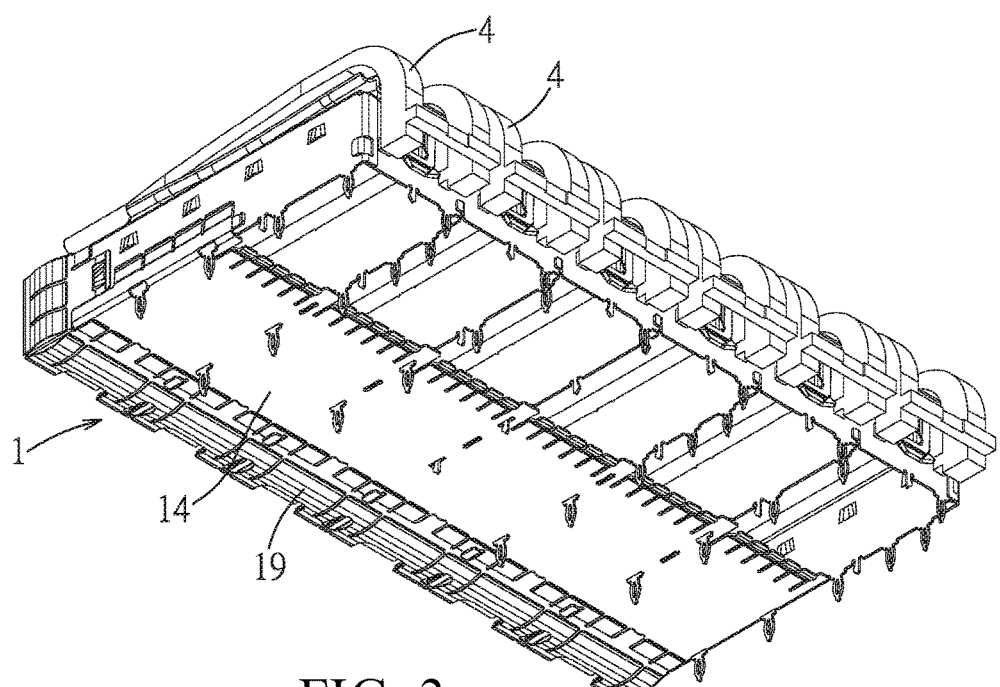
FIG. 3 is a perspective view illustrating a bottom wall of a cage of the embodiment.
Figure 4:
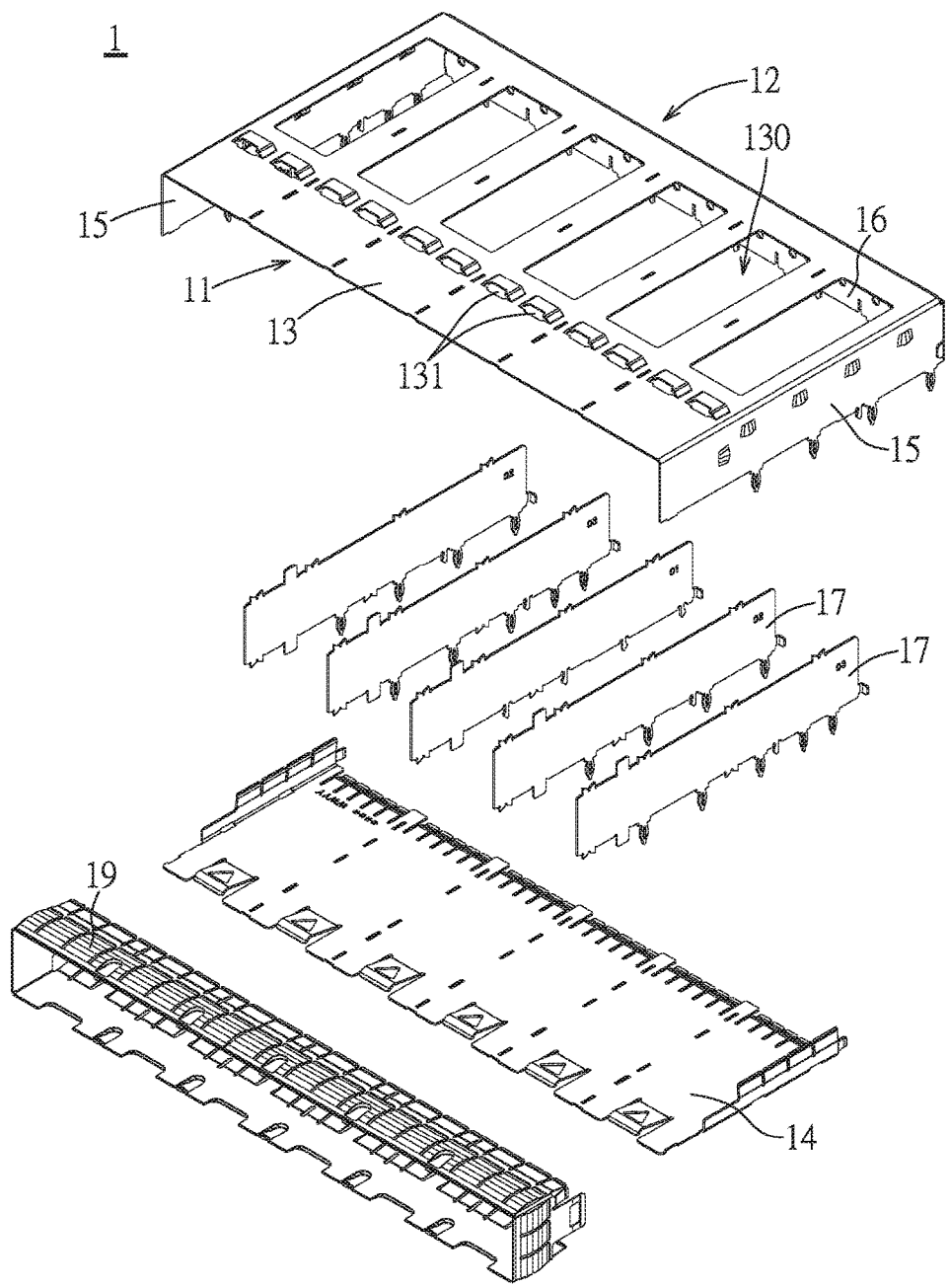
FIG. 4 is an exploded perspective view illustrating a detailed structure of the cage of the embodiment.

The following description relates to specific embodiments in combination with Figures which may implement the present disclosure. Representations of directions, such as up, down, front rear, left and right, in the present disclosure are only the directions shown in the Figures. Therefore representations of directions are only used for explanation, but are not used to limit the present disclosure.

As can be appreciated, a number of different embodiments are depicted. In some embodiments, the frame of the clip defines an opening along a periphery of the frame, and the clip has a front frame bar, the holding piece is bent upwardly from the front frame bar. In some embodiments, the light guide comprises at least two light pipes which are connected with each other, the front section has a first bridging portion connecting the at least two light pipes, the first bridging portion has a downward extending portion protruding downwardly and positioned between the two light pipes, the first post is formed to the downward extending portion, the rear section extends downwardly toward the rear wall of the cage and has a second bridging portion connecting the at least two light pipes. In some embodiments, one of the second posts is a similar cylinder formed by partially cutting a cylinder along an axial direction and has a cut-formed portion. In some embodiments, the top wall of the cage is further formed with at least one latching hole, the clip further comprises a hook portion extending downwardly from the frame and is used to engage with the latching hole. In some embodiments, the rear wall of the cage is further formed with at least one rear tab protruding from the rear wall, the clip further comprises at least one extending latch piece extending downwardly from the frame, the extending latch piece has a latch hole, the two rear tabs of the rear wall pass through the latching hole and are engaged with the extending latch piece.

In some embodiments, the cage is formed with a plurality of ports side by side. In some embodiments, the cage further comprises a bottom wall opposite to and spaced apart from the top wall, two side walls each connecting the bottom wall and the top wall, and a plurality of dividing walls spaced apart from each other and provided between the two side walls, the plurality of dividing walls and the two side walls cooperate with each other to define the plurality of ports. In some embodiments, the front end of the cage is further formed with a plurality of elastic pieces side by side.

One potential benefit of the present disclosure is that the first post of the light guide is inserted into the first hole of the holding piece of the clip along the front-to-rear direction, at the same time the two second posts of the light guide are respectively inserted into the two second holes of the rear wall of the cage along the rear-to-front direction. In this manner, the light guide can be firmly provided on the cage and the clip, and the light guide has opposite abutting and holding effects along the front-rear direction, and moreover, the first post and the two second posts of the light guide are can provide three securing locations, thereby helping to assure the light guide is held securely and is not easily disengaged from the cage and the clip.

Referring to the FIGs., an embodiment of a cage assembly comprises a cage 1, six heat sinks 2, six clips 3 and six light guides 4.

As depicted, the cage 1 comprises a front end 11, a rear end 12, a top wall 13, a bottom wall 14, two side walls 15, a rear wall 16, and five dividing walls 17. The rear end 12 and the front end 11 are opposite to each other, the top wall 13 and the bottom wall 14 are positioned between the front end 11 and the rear end 12 and are spaced apart from each other along an up-down direction, and the top wall 13 is further formed with a plurality of latching holes 131 arranged along a left-right direction, the two side walls 15 each connect the top wall 13 and the bottom wall 14 and the two side walls 15 are spaced apart from each other along the left-right direction. The dividing walls 17 are spaced apart from each other and are provided between the two side walls 15. The dividing walls 17 and the two side walls 15 cooperate with each other to define six ports 18 side by side, each port 18 extends from the front end 11 to the rear end 12 and allows a plug connector (not shown) to be inserted into each port 18 from the front end 11, and the top wall 13 is provided with a plurality of openings 130 each formed at a position of the top wall 13 corresponding to each port 18.

Figure 5:
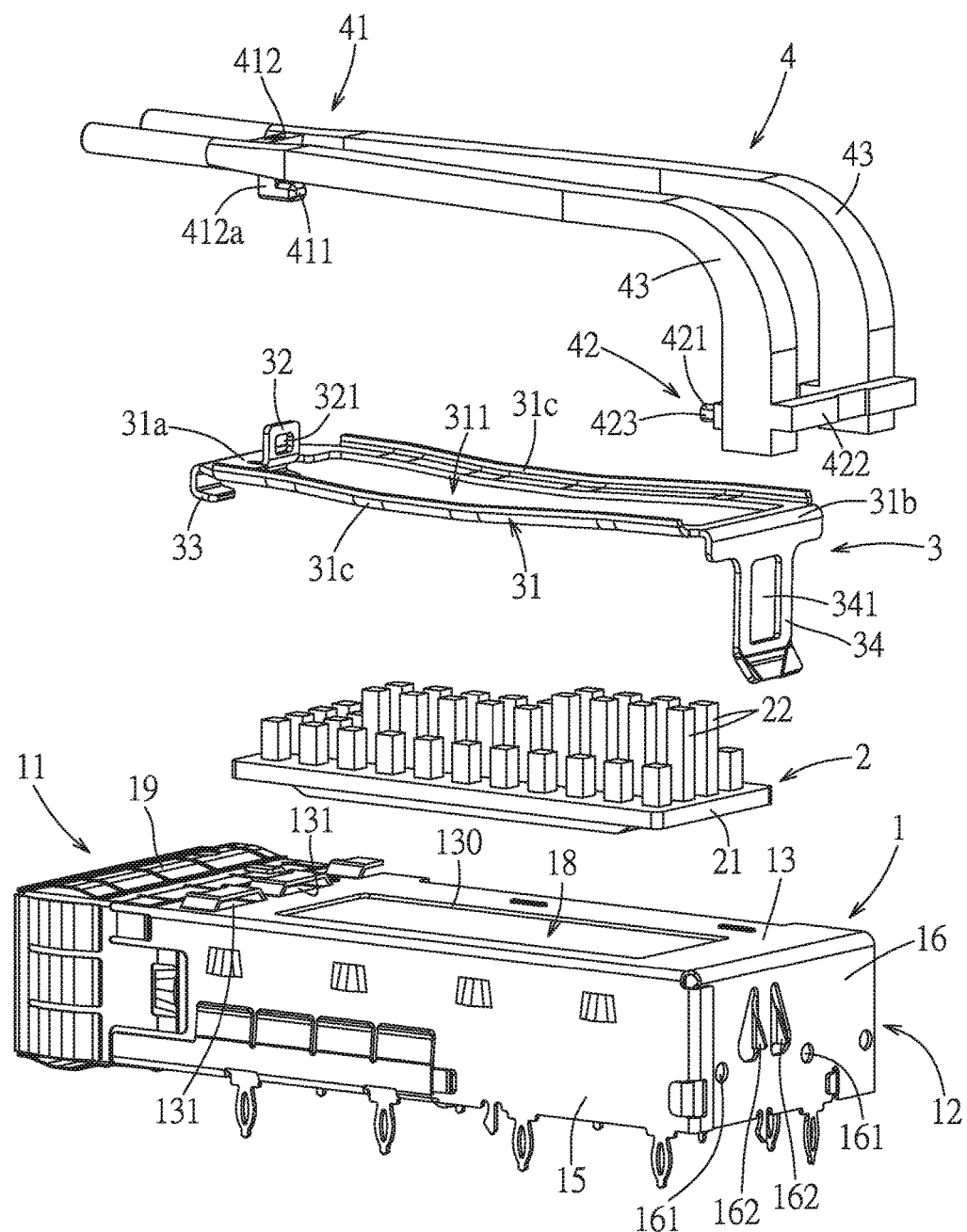
FIG. 5 is an exploded perspective view illustrating one port and a heat sink, a clip and a light guide which correspond to the one port of the embodiment.

The rear wall 16 defines the rear end 12 of the cage 1 and extends downwardly from a rear edge of the top wall 13 and connects the two side walls 15, and each region of the rear wall 16 corresponding to one port 18 is formed with two rear tabs 162 protruding from the rear wall 16 (see FIG. 5). In the embodiment, specifically, the rear tab 162 is a protruding tab bent rearwardly from the rear wall 16 and extending therefrom. In addition, the front end 11 of the cage 1 is further formed with a gasket 19. The gasket 19 helps the front end 11 of the cage 1 to be tightly engaged with an opened groove of a panel of a device casing (not shown).

The cage 1 is provided on a circuit board (not shown) and covers a connector (not shown) on the circuit board, when a plurality of electrical connectors are correspondingly inserted into the ports 18, the plurality of electrical connectors are protected under a shielding function from the cage 1, so as to avoid Electro Magnetic Interference (EMI) among the plurality of electrical connectors, and the cage assembly in the embodiment is correspondingly provided to the panel of the device casing (not shown) from the front end 11.

Figure 6:
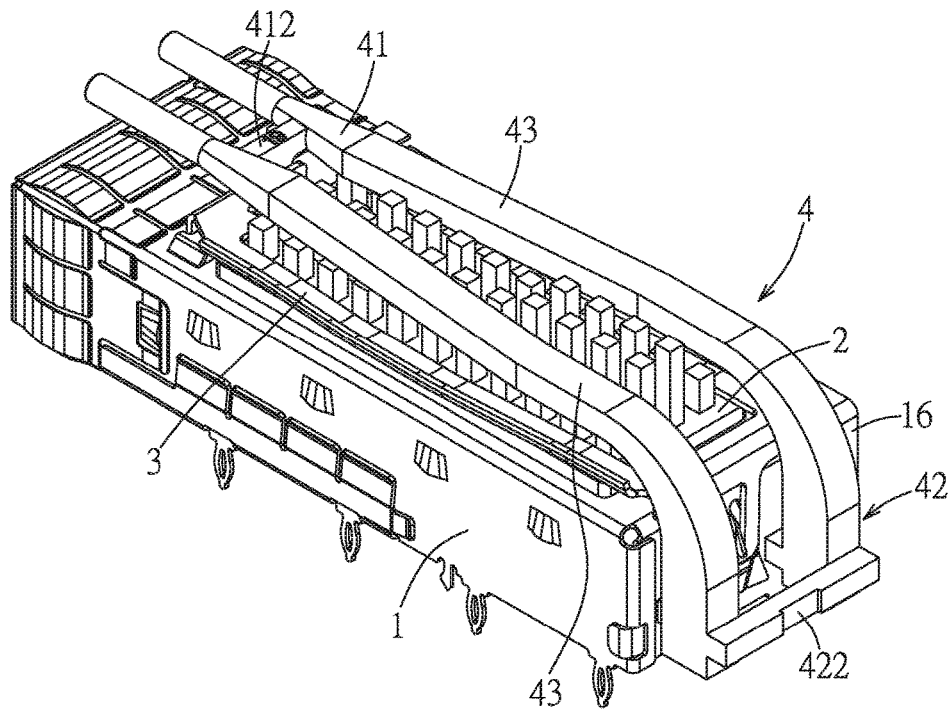
FIG. 6 is a perspective view illustrating the one port of the embodiment and an assembled status of the detailed structure thereof.
Figure 7:
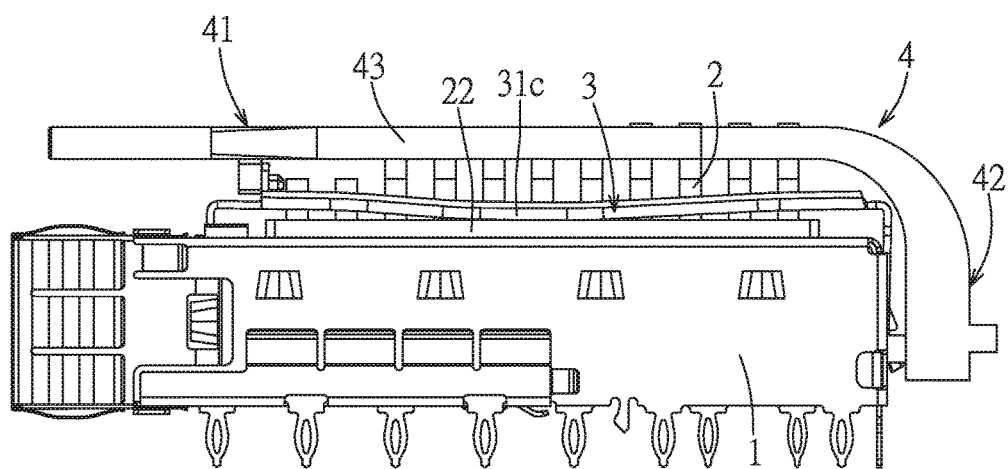
FIG. 7 is a side view of FIG. 6 illustrating the assembled status of the embodiment.
Figure 8:
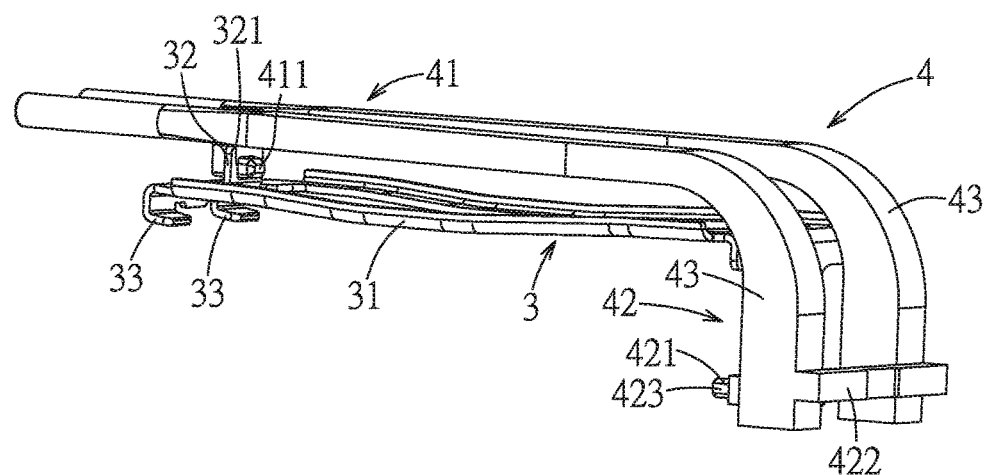
FIG. 8 is a perspective view illustrating that a first post of a light guide is inserted into a first hole of the clip.
Figure 9:
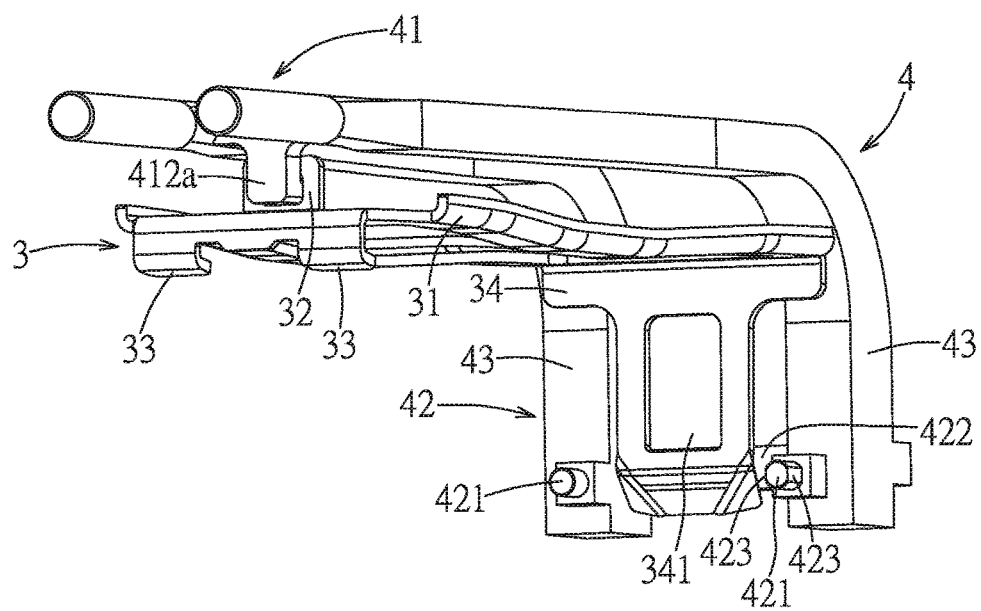
FIG. 9 is a perspective view illustrating two second posts of the light guide of the embodiment.
Figure 10:
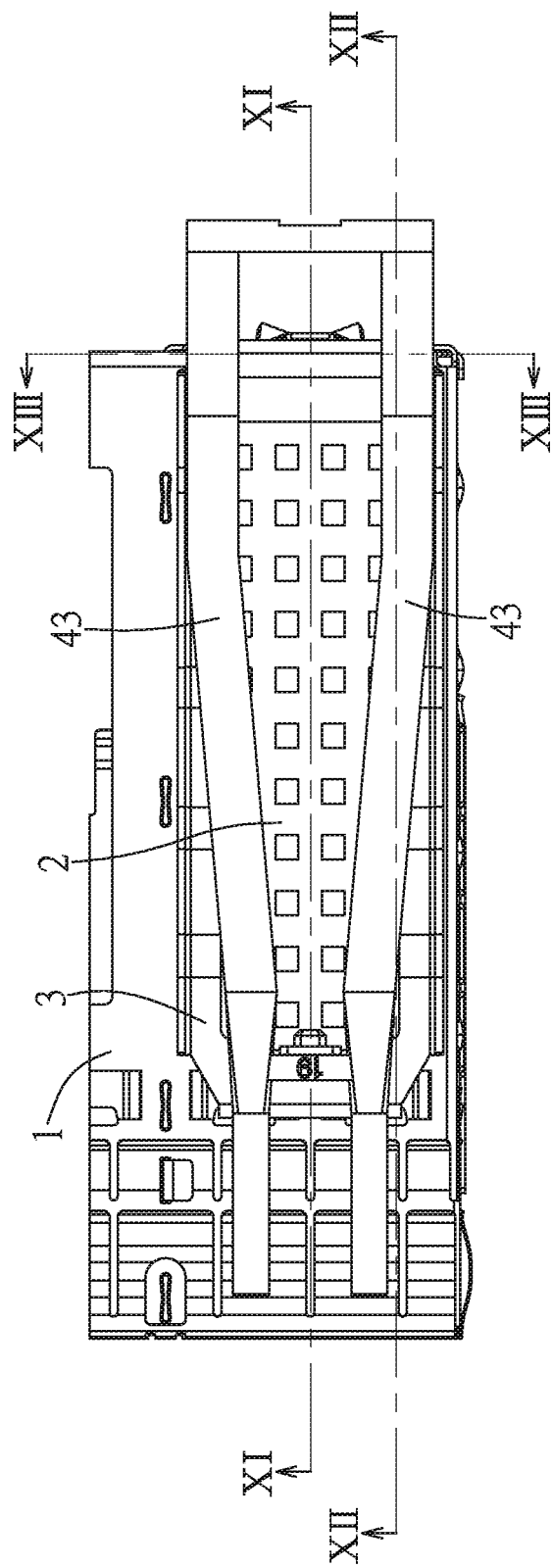
FIG. 10 is a top view of FIG. 6 illustrating the assembled status of the embodiment.
Figure 11:
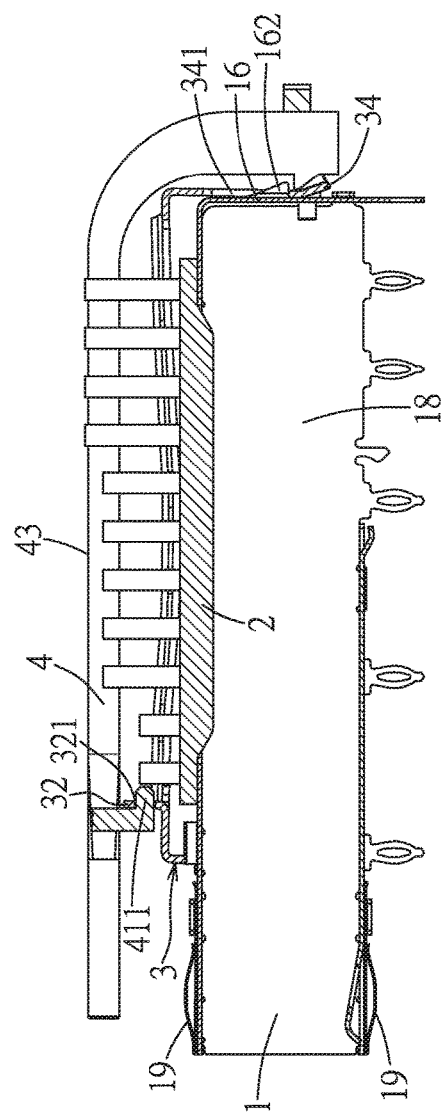
FIG. 11 is a cross sectional view taken along a line XI-XI of FIG. 10 illustrating that the first post is inserted into the first hole in the embodiment.
Figure 12:
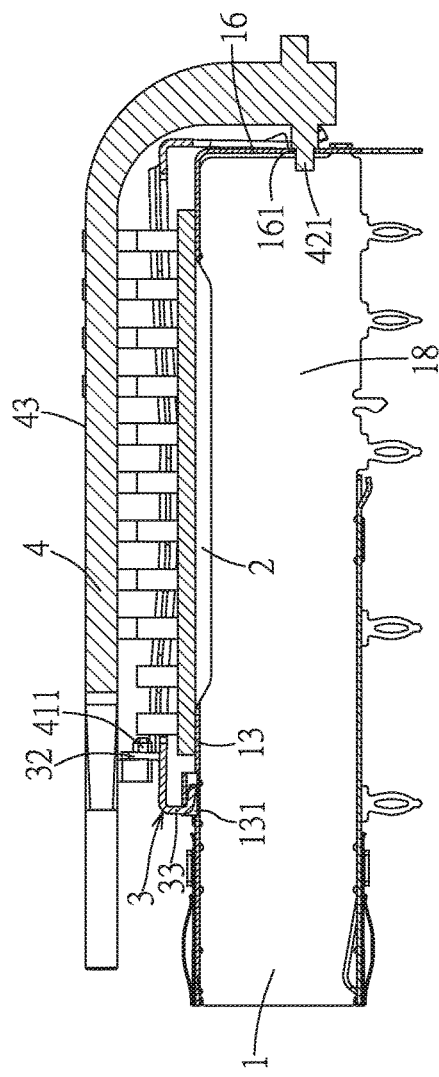
FIG. 12 is a cross sectional view taken along a line XII-XII of FIG. 10 illustrating that each second post is inserted into one corresponding second hole in the embodiment.
Figure 13:
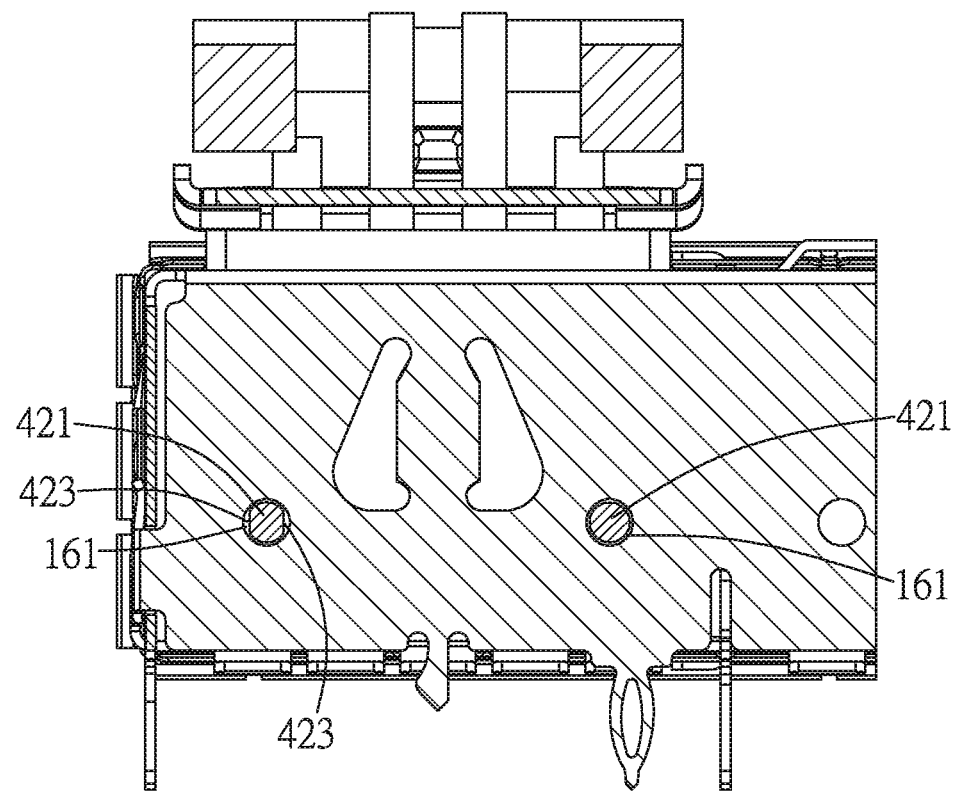
FIG. 13 is a cross sectional view taken along a line XIII-XIII of FIG. 10 illustrating that one of the two second posts has a cut-formed portion in the embodiment.

In order to conveniently describe the embodiment, FIG. 5, FIG. 6 and FIG. 7 are views that the cage assembly is partially cut so as to illustrate one port 18 and one heat sink 2, one clip 3 and one light guide 4 which correspond to the one port 18. The heat sink 2 is provided on the top wall 13 of the cage 1, covers the opening 130 and corresponds to the port 18, and the heat sink 2 is used to dissipate out heat from the inside of the port 18, the heat sink 2 as shown in these figures is one, taking as an example, comprises a plate portion 21 and a plurality of heat dissipating columns 22 extending upwardly from the plate portion 21.

The clip 3 comprises a frame 31, a holding piece 32, two hook portions 33 and an extending latch piece 34. The clip 3 is engaged with the top wall 13 of the cage 1 and is used to secure the heat sink 2. Specifically, the frame 31 has a front frame bar 31a, a rear frame bar 31b and two side frame bars 31c which are connected with each other so as to allow the frame 31 to define an opening 311 along a periphery of the frame 31. The holding piece 32 extends upwardly from the front frame bar 31a of the frame 31 and is positioned close to the front end 11 of the cage 1. During manufacturing, the holding piece 32 is formed by punching bending upwardly a plate piece integrally connected to the front frame bar 31*a* of the frame 31. Each of the two hook portions 33 is a structure bent downwardly from a front edge of the front frame bar 31*a* of the frame 31 and then bent rearwardly so as to form a hook shape, the two hook portions 33 can be respectively engaged with the two latching holes 131 of the top wall 13 of the cage 1. And the extending latch piece 34 extends downwardly from the rear frame bar 31*b* of the frame 31 and is used to correspond to the rear wall 16 of the cage 1, and the extending latch piece 34 is formed with a latch hole 341, the latch hole 341 is used to allow the two rear tabs 162 of the rear wall 16 to pass through and be engage with the extending latch piece 34.

Therefore, when the clip 3 is assembled to and positioned on the cage 1, the two hook portions 33 are respectively engaged with the two latching holes 131 of the top wall 13 of the cage 1 and extending latch piece 34 corresponds to the rear wall 16 of the cage 1, and the two rear tabs 162 of the rear wall 16 pass through the latch hole 341 and are engaged with the extending latch piece 34. As can be appreciated, the heat dissipating columns 22 of the heat sink 2 pass through the opening 311 of the frame 31, and the two side frame bars 31*c* of the frame 31 respectively press against two sides of the plate portion 21 of the heat sink 2.

As depicted, the light guide 4 has a front section 41 positioned above the top wall 13 of the cage 1 and a rear section 42 positioned behind the rear wall 16 of the cage 1. The front section 41 is formed with a first post 411 extending rearwardly, and the rear section 42 is formed with two second posts 421 respectively extending forwardly. Specifically, the light guide 4 includes two (or more) light pipes 43 which are connected with each other; the front section 41 has a first bridging portion 412 connecting the two light pipes 43, and the first bridging portion 412 has a downward extending portion 412*a* protruding downwardly and positioned between the two light pipes 43. As shown, the first post 411 is formed to the downward extending portion 412*a* of the first bridging portion 412 and protrudes rearwardly while the rear section 42 extends downwardly toward the rear wall 16 of the cage 1 and has a second bridging portion 422 connecting the at least two light pipes 43. Thus the two second posts 421 are respectively formed at two distal ends of the rear section 42 and respectively protrude forwardly from the two light pipes 43. As can be appreciated, the first post 411 engages the holding piece 32 of the clip 3 that is formed with a first hole 321 while the two second posts 421 of the light guide 4 can engage two second holes 161 in the rear wall 16, and the two rear tabs 162 corresponding to each port 18 are positioned between the two first holes 161.

When the light guide 4 is assembled to the clip 3 and the cage 1, the first post 411 of the light guide 4 is inserted into the first hole 321 of the holding piece 32 of the clip 3 along a front-to-rear direction, the two second posts 421 of the light guide 4 are respectively inserted into the two second holes 161 of the rear wall 16 of the cage 1 along a rear-to-front direction, therefore the light guide 4 is assembled to and engaged with the cage 1 and the clip 3, at this time, the front section 41 of the light guide 4 is positioned above the clip 3 and the heat sink 2, and the rear section 42 of the light guide 4 is positioned behind the rear wall 16 of the cage 1.

As can be appreciated, in operation the light guide 4 is configured so that a bottom end of each light pipe 43 at the rear section 42 corresponds to a light emitting member (such as a light emitting diode) provided on a circuit board. In an embodiment a light beam from the light emitting member is guided to a front end of each light pipe 43, in turn a user can determine an operative status of an electronic device by observing a status of the light beam at the front end of each light pipe 43. According to requirement on the display of the light beam, the light guide 4 may comprises at least two or more light pipes 43 which are connected with each other, for example, four light pipes 43 which are connected with each other. In the embodiment, the light guides 4 are respectively separate members, but the light guides 4 may be also arranged side by side and may be integrally connected with each other, and so the light guides 4 are not limited to the depicted embodiments. The second hole 161 of the rear wall 16 of the cage 1 and the second post 421 of the light guide 4 which cooperate with each other may be provided more than two pairs in number A can be appreciated, the two hook portions 33 of the clip 3 are respectively engaged with the two latching holes 131 of the top wall 13 of the cage 1, and the two rear tabs 162 of the rear wall 16 pass through the latch hole 341, therefore the clip 3 and the heat sink 2 are firmly positioned on the top wall 13 of the cage 1. On the other hand, the first post 411 of the light guide 4 is inserted into the first hole 321 of the holding piece 32 of the clip 3 along the front-to-rear direction, the two second posts 421 of the light guide 4 are respectively inserted into the two second holes 161 of the rear wall 16 of the cage 1 along the rear-to-front direction, therefore the first post 411 and the two second posts 421 which are opposite to the first post 411 together attain a clamping effect, so the light guide 4 are firmly provided on the cage 1 and the clip 3, and the light guide 4 has opposite abutting and holding effects along the front-rear direction, and moreover, the first post 411 and the two second posts 421 of the light guide 4 are designed as three holding locations, thereby assuring the light guide 4 to be firmly held in various directions, the assembled light guide 4 is not easily disengaged from the cage 1 and the clip 3. It should be additionally noted that, in the embodiment, because the holding piece 32 is formed by punching and bending upwardly a plate piece integrally connected to the front frame bar 31*a* of the frame 31, during manufacturing, a height of the holding piece 32 and a height of the first hole 321 can be adjusted according to a height of the heat sink 2.

As depicted, one of the two second posts 421 is a cylinder having a circular cross section, the other of the two second posts 421 is a similar cylinder formed by partially cutting a left side and a right side of a cylinder along an axial direction and has two cut-formed portions 423, so that the second post 421 has a substantial ellipse cross section perpendicular to the axial direction. The provision of the cut-formed portion 423 is used to overcome manufacturing and assembly tolerance, during practical manufacturing, the two second posts 421 may not be exactly matched with the two second holes 161, therefore, in the embodiment, by means of smaller cross section due to the cut-formed portion 423, it can assure the two second posts 421 to be smoothly insert into the two second holes 161. Certainly, both of the two second posts 421 may each have the cut-formed portion 423, so it similarly attains the purpose of overcoming manufacturing and assembly tolerance but the present disclosure is not limited to this.

Thus, in operation the first post 411 of the light guide 4 can be inserted into the first hole 321 of the holding piece 32 of the clip 3 along the front-to-rear direction while at the same time the two second posts 421 of the light guide 4 are respectively inserted into the two second holes 161 of the rear wall 16 of the cage 1 along the rear-to-front direction, so the light guide 4 is secured to the cage 1 and the clip 3, and the light guide 4 has opposite abutting and holding effects along the front-rear direction. In addition, the first post 411 and the two second posts 421 of the light guide 4 are designed as three holding locations, thereby assuring the light guide 4 to be firmly held in various directions, the assembled light guide 4 is not easily disengaged from the cage 1 and the clip 3.

The above described are only the embodiments, which cannot limit the scope of the implementation of the present disclosure, namely simple equivalent variations and modifications made according to the scope of the claims and content of the present disclosure are still fallen within the scope of the present disclosure.

The invention claimed is:

1. A cage assembly, comprising:
   a cage comprising a front end, a rear end, a top wall positioned between the front end and the rear end, and a rear wall positioned at the rear end, and the cage being formed with at least one port;
   a heat sink provided on the top wall of the cage and corresponding to one port;
   a clip engaged with the cage and comprising a frame fixing the heat sink and a holding piece extending upwardly from the frame; and
   a light guide having a front section positioned above the top wall of the cage of and a rear section positioned behind the rear wall of the cage, the front section being formed with a first post extending rearwardly, the rear section being formed with at least two second posts respectively extending forwardly, the holding piece of the clip being formed with a first hole, the first post of the light guide being inserted into the first hole of the holding piece of the clip along a front-to-rear direction , the rear wall of the cage being formed with second holes respectively corresponding to the second posts, the second post of the light guide being inserted into the second hole of the rear wall of the cage along a rear-to-front direction,
   wherein the frame of the clip defines an opening along a periphery of the frame, and the clip has a front frame bar, the holding piece is bent upwardly from the front frame bar,
   wherein the light guide comprises at least two light pipes which are connected with each other, the front section has a first bridging portion connecting the at least two light pipes, the first bridging portion has a downward extending portion protruding downwardly and positioned between the two light pipes, the first post is formed to the downward extending portion, the rear section extends downwardly toward the rear wall of the cage and has a second bridging portion connecting the at least two light pipes, and
   wherein one of the second posts is a similar cylinder formed by partially cutting a cylinder along an axial direction and has a cut-formed portion.

2. The cage assembly according to claim 1, wherein the cage is formed with a plurality of ports side by side.

3. The cage assembly according to claim 2, wherein the cage further comprises a bottom wall opposite to and spaced apart from the top wall, two side walls each connecting the bottom wall and the top wall, and a plurality of dividing walls spaced apart from each other and provided between the two side walls, the plurality of dividing walls and the two side walls cooperate with each other to define the plurality of ports.

4. The cage assembly according to claim 3, wherein the front end of the cage is further formed with a plurality of elastic pieces side by side.

5. A cage assembly, comprising:
   a cage comprising a front end, a rear end, a top wall positioned between the front end and the rear end, and a rear wall positioned at the rear end, and the cage being formed with at least one port;
   a heat sink provided on the top wall of the cage and corresponding to one port;
   a clip engaged with the cage and comprising a frame fixing the heat sink and a holding piece extending upwardly from the frame; and
   a light guide having a front section positioned above the top wall of the cage of and a rear section positioned behind the rear wall of the cage, the front section being formed with a first post extending rearwardly, the rear section being formed with at least two second posts respectively extending forwardly, the holding piece of the clip being formed with a first hole, the first post of the light guide being inserted into the first hole of the holding piece of the clip along a front-to-rear direction, the rear wall of the cage being formed with second holes respectively corresponding to the second posts, the second post of the light guide being inserted into the second hole of the rear wall of the cage along a rear-to-front direction, wherein the top wall of the cage is further formed with at least one latching hole, the clip further comprises a hook portion extending downwardly from the frame and is used to engage with the latching hole.

6. The cage assembly according to claim 5, wherein the rear wall of the cage is further formed with at least one rear tab protruding from the rear wall, the clip further comprises at least one extending latch piece extending downwardly from the frame, the extending latch piece has a latch hole, the two rear tabs of the rear wall pass through the latching hole and are engaged with the extending latch piece.

7. The cage assembly according to claim 5, wherein the cage is formed with a plurality of ports side by side.

8. The cage assembly according to claim 7, wherein the cage further comprises a bottom wall opposite to and spaced apart from the top wall, two side walls each connecting the bottom wall and the top wall, and a plurality of dividing walls spaced apart from each other and provided between the two side walls, the plurality of dividing walls and the two side walls cooperate with each other to define the plurality of ports.

9. The cage assembly according to claim 8, wherein the front end of the cage is further formed with a plurality of elastic pieces side by side.

\* \* \* \* \*